UNITED STATES PATENT OFFICE 2,383,762

PREPARATION OF A GREEN DYESTUFF AND STARTING MATERIAL THEREFOR

Rudolf Bloch and Isaac Schnerb, Jerusalem, Palestine, assignors to Palestine Potash Ltd., Jerusalem, Palestine, a British company No Drawing. Application January 21, 1943, Serial No. 473,113. In Palestine November 10, 1942

16 Claims. (Cl. 260—439)

This invention relates to the preparation of a green dyestuff and to a starting material for such preparation. More specifically, the invention relates to the preparation and a starting material for the preparation of a green dyestuff which is a derivative of 2-naphthol-6-sulfonic acid and appears to be related to, and possibly identical with, naphthol green. In this connection, however, it is to be remarked that the constitution of neither naphthol green nor of the dyestuff according to the present invention is known to such an extent as to identify them or differentiate between them with certainty.

Naphthol green is usually manufactured by a process that involves in principle the following steps, viz.:

1. The preparation of Schäffer's acid (2-naphthol-6-sulfonic acid).
2. The introduction into Schäffer's acid of a nitroso group, presumably in the 1-position, by a treatment with sodium nitrite and an equivalent amount of sulfuric or hydrochloric acid, and the subsequent formation of nitroso-Schäffer's salt by neutralizing the sulfonic acid group with alkali (including ammonium). In this specification and the appended claims, the term "Schäffer's salt" is to denote broadly any alkali salt or the ammonium salt of Schäffer's acid.
3. The formation of an aqueous solution of the dyestuff by adding an iron salt, usually ferric chloride, to a solution or suspension in water of nitroso-Schäffer's salt, whereby a complex molecule containing one atom of iron for a number of molecules of nitroso-Schäffer's salt is formed, and thereafter neutralizing the reaction mixture or making it slightly alkaline. As far as the textbooks contain any indication as to the constitution of naphthol green, they assume that this complex molecule is composed of two molecules of nitroso-Schäffer's salt and one atom of iron, but our own experiments tend to show that six molecules of nitroso-Schäffer's salt are coupled with one single iron atom.

The dyestuff may be obtained in the dry state by evaporation of the solution, if desired, after filtering off any iron hydroxide that may have separated.

By the process according to the present invention a green dyestuff similar in every respect to, but possibly even faster than, the dyestuff prepared in the manner described hereinabove can be obtained by a much simpler process the main feature of which is that no acid is needed as a reagent in any stage of the process subsequent to the preparation of Schäffer's acid, which is of considerable advantage as will be more fully explained below.

We have surprisingly found that the introduction of the nitroso group into the molecule of Schäffer's acid and the formation of the dyestuff can be carried out in one single operation by the simultaneous action on Schäffer's salt of a nitrite and an iron salt in an aqueous medium which is slightly acid solely due to the hydrogen ion concentration of the iron salt (which, under the conditions most favourable for carrying out this invention, is of the magnitude of about pH=3.5).

Accordingly, the process of this invention consists in principle in the simultaneous reaction of Schäffer's salt in water with a nitrite and an iron salt, the amount of the nitrite used being no less than one mole for each mole of Schäffer's salt while the amount of iron salt is so chosen that no less than one equivalent weight of its anion component is present for each mole of Schäffer's salt, that is, half a mole of a bi-valent iron salt (such as ferrous sulfate) or one-third of a mole of a tri-valent iron salt (such as ferric chloride).

The process according to this invention may be carried out, for example, by suspending Schäffer's salt, preferably the sodium salt, in an aqueous solution of the required amount of a nitrite, preferably sodium nitrite, and into this solution, the iron salt is introduced either in solid form or in the form of an aqueous solution.

Another way of carrying out the invention consists in preparing a dry mixture of Schäffer's salt, nitrite and iron salt in the equivalent proportions stipulated above and introducing this mixture into water, preferably in portions.

In all these cases, the decomposition of the nitrite and the formation of the nitroso compound goes on quickly, and even violently if the temperature of the reaction mixture is allowed to rise too much, say above 30° C., or if the concentration of the reagents within the mixture is too high. When the reaction has come to an end the reaction mixture is neutralized or rendered slightly alkaline much in the same way as in the known processes of preparing naphthol green, whereupon the formerly dark brown colour of the mixture changes into a dark green. The dyestuff may then be obtained in dry form by evaporating the solution, if desired, after filtering off any iron hydroxide that separates. On the other hand, where a rather dilute aqueous solution of the dyestuff is required, the dark brown reaction liquor may at once be poured into water where, owing to the dilution, it turns green without previous neutralization.

As compared with the known naphthol green processes, the process according to this invention offers first of all the advantage that due to the absence of mineral acid as a reagent, no acid-proof reaction vessels, pumps and other installation are required. In addition, the reaction proceeds so much quicker that with the same capacity of the plant, considerably more dyestuff can be produced in the unit of time. As a matter of fact, our experiments have shown that a 50% increase of output can easily be obtained.

The second way of carrying out the invention, mentioned above, offers still additional advantages. Apart from the preparation of the dry mixture of the reagents which is done very easily, the operation is reduced to the single step of taking this mixture up in water. The mixture can be kept in store without decomposition for a long time, and indeed for months, which makes it possible to prepare the dyestuff solution at any convenient time that fits into the general production plan of the factory. Moreover, where the dyestuff is eventually needed in solution which is the case with practically all of its applications, the consumer can prepare himself the dyestuff solution from the dry mixture of the reagents instead of from the dry dyestuff which means that the whole evaporating operation with all its costs of fuel, time, labour and installation can be saved which would otherwise be necessary for obtaining the dry dyestuff. In this connection it is also to be remarked that the evaporation, if carried out above about 70° C., inevitably destroys a more or less considerable part of the dyestuff which means a certain loss of yield. This loss, too, is avoided by omitting the evaporating operation.

For the proper performance of the process according to this invention, the concentration of Schäffer's salt in the water in which it is taken up for the reaction should be comprised between about 25 to 100 grs. pro litre. With lower concentrations, the reaction would be too slow, or even not take place at all, with higher concentrations it would become too violent.

*Example 1*

Schäffer's salt is prepared, in a manner known per se, by sulfonating 100 grs. of 2-naphthol with 147 grs. of concentrated sulfuric acid at a temperature of 95 to 100° C. After stirring the mixture for about 2 hours, 1 litre of water of about 80° C., added to with 130 grs. of sodium chloride, is poured in. Schäffer's salt precipitates and is filtered off. The salt is washed on the filter with sodium chloride solution, and the washing liquor is incorporated with the original filtrate which contains sulfuric and hydrochloric acid in a concentration of about 9% (calculated as sulfuric acid). The combined filtrate and washing liquor can be further utilized as will be described below.

25 grs. of the Schäffer's salt prepared as aforesaid are suspended in a solution of 8 grs. of sodium nitrite in 300 grs. of water, and 14 grs. of ferrous sulfate ($FeSO_4.7H_2O$) are slowly added, the temperature of the reaction mixture being kept below 30° C. The ferrous sulfate may be added in dry form or in aqueous solution, the concentration of which should preferably be so chosen as to contain about 40 grs. of iron ion per litre. When the reaction has come to an end which is indicated thereby that the liquor has assumed a deep brown colour and no more gas bubbles appear therein, the reaction liquor is neutralized with an aqueous solution of sodium hydroxide, with brilliant yellow serving as an indicator. With the amount of reagents used in this example, this requires about 0.6 gr. of NaOH. This causes the brown colour to change into a deep green. From this dyestuff solution the solid dyestuff can be obtained by evaporation in the usual manner.

*Example 2*

The process is carried out as in Example 1, but instead of 14 grs. of ferrous sulfate, 9 grs. of ferric chloride ($FeCl_3.6H_2O$) are used.

*Example 3*

A dry mixture is prepared from 100 grs. of Schäffer's salt, 32 grs. of sodium nitrite and 60 grs. of ferrous sulfate ($FeSO_4.7H_2O$). All the components must be dry. The mixture is a yellowish powder which, if protected against moisture, keeps for a long time.

24 grs. of this mixture are dissolved in 300 grs. of water under stirring, the temperature of the solution being kept below 30° C. The reaction then goes on as described in Example 1.

It has been described in Example 1 that in the preparation of Schäffer's salt, an acid filtrate is finally obtained. The acid contained therein may be utilized by dissolving metallic iron in this filtrate and using the resulting solution of iron sulfate plus iron chloride for the reaction with Schäffer's salt and nitrite. This not only means a full utilisation of the whole acid employed but in addition, the relatively small amount of Schäffer's salt which had remained in solution and is, therefore, contained in the filtrate is put to use in the preparation of the dyestuff the yield of which is accordingly increased.

If it is intended to keep the mixture of ferrous sulfate and ferric chloride obtained as aforesaid for use at a later time or at another place, it may be dried by evaporation and the dry mixture may be added to the Schäffer's salt-nitrite solution either as such or after being re-dissolved in water.

We claim:

1. In the preparation of a green dyestuff, the step of mixing Schäffer's salt with an inorganic ionizable nitrite and an iron salt having an acid reaction in aqueous solution, and subjecting the components to the action of water while maintaining the aqueous mixture slightly acid solely by the hydrogen ion concentration established by the iron salt.

2. In the preparation of a green dyestuff, the step of mixing Schäffer's salt with sodium nitrite and a mixture of ferrous sulfate and ferric chloride, and subjecting the components to the action of water while maintaining the aqueous mixture slightly acid solely by the hydrogen ion concentration established by the iron salt.

3. In the preparation of a green dyestuff, the step of mixing Schäffer's salt with an inorganic ionizable nitrite and an iron salt having an acid reaction in aqueous solution, the nitrite being used in a proportion of at least one mol for each mol of Schäffer's salt, and the iron salt in a proportion of at least one equivalent weight of its anion component for each mol of Schäffer's salt, and subjecting the components to the action of water while maintaining the aqueous mixture slightly acid solely by the hydrogen ion concentration established by the iron salt.

4. In the preparation of a green dyestuff, the step of mixing Schäffer's salt with an inorganic ionizable nitrite and ferrous sulfate in a proportion of at least one mol of nitrite and half a mol of ferrous sulfate for each mol of Schäffer's salt, and subjecting the components to the action of water while maintaining the aqueous mixture slightly acid solely by the hydrogen ion concentration established by the iron salt.

5. In the preparation of a green dyestuff, the step of mixing Schäffer's salt with an inorganic ionizable nitrite and ferric chloride in a proportion of at least one mol of nitrite and ⅓ of a mol of ferric chloride for each mol of Schaäffer's salt, and subjecting the components to the action of water while maintaining the aqueous mixture slightly acid solely by the hydrogen ion concentration established by the iron salt.

6. Process for the preparation of a green dyestuff, comprising suspending Schäffer's salt in an aqueous solution of an inorganic ionizable nitrite and adding thereto an iron salt having an acid reaction in aqueous solution while maintaining the aqueous mixture slightly acid solely by the hydrogen ion concentration established by the iron salt.

7. In the preparation of a green dyestuff, the steps of preparing a dry mixture of Schäffer's salt, inorganic alkali nitrite and ferrous sulfate in a proportion of substantially one mol of nitrite and half a mol of ferrous sulfate for each mol of Schäffer's salt, and subjecting the components of said mixture to the action of water while maintaining the aqueous mixture slightly acid solely by the hydrogen ion concentration established by the iron salt.

8. The method set forth in claim 1, wherein the iron salt comprises at least one member selected from the group consisting of chlorides and sulfates of iron.

9. The process set forth in claim 6, wherein the iron salt comprises at least one member selected from the group consisting of chlorides and sulfates of iron.

10. As a starting material for the preparation of a green dyestuff, a dry mixture of Schäffer's salt, inorganic alkali nitrite and about ⅓ to ½ mol of an iron salt having an acid reaction in aqueous solution.

11. A starting material according to claim 10, wherein the iron salt comprises at least one member selected from the group consisting of the chlorides and sulfates of iron.

12. In the preparation of a green dyestuff, the step of mixing Schäffer's salt with an inorganic ionizable nitrite and an iron salt having an acid reaction in aqueous solution, and subjecting the components to the action of water at a temperature not substantially above 30° C. while maintaining the aqueous mixture slightly acid solely by the hydrogen ion concentration established by the iron salt.

13. Process for the preparation of a green dyestuff, comprising suspending Schäffer's salt in an aqueous solution of an inorganic ionizable nitrite and adding thereto an iron salt having an acid reaction in aqueous solution while preventing the temperature from rising substantially above 30° C. and maintaining the aqueous mixture slightly acid solely by the hydrogen ion concentration established by the iron salt.

14. In the method of preparing a green dyestuff, the improvement which comprises suspending Schäffer's salt in an aqueous solution of sodium nitrite, adding ferrous sulfate to the suspension while keeping the temperature of the suspension below 30° C. to obtain a dark brown mixture, neutralizing the mixture and maintaining the aqueous mixture slightly acid solely by the hydrogen ion concentration established by the iron salt with alkali whereby the color of the mixture is changed to dark green, and recovering a green dyestuff from said mixture.

15. The method of preparing green dyestuff solutions, which comprises mixing dry Schäffer's salt with dry inorganic alkali nitrite and a dry iron salt selected from the group consisting of the chlorides and sulfates of iron to obtain a dry mixture of yellowish color, and dissolving the dry mixture in water to obtain a dilute aqueous solution of green color.

16. The method of preparing a green dyestuff, which comprises mixing Schäffer's salt with an inorganic ionizable nitrite and an iron salt having an acid reaction in aqueous solution, and subjecting the components to the action of water while maintaining a pH of the order of about 3.5 in the reaction mixture.

RUDOLF BLOCH.
ISAAC SCHNERB.